July 24, 1928.
G. E. FENTRESS
BELT TIGHTENER
Filed Aug. 23, 1927
1,678,287
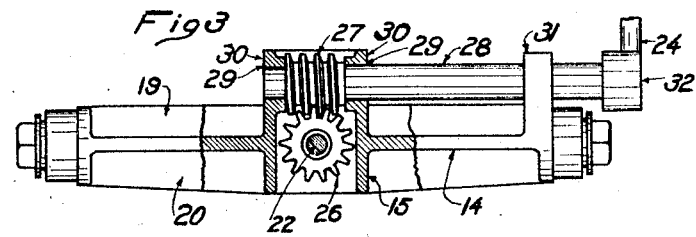
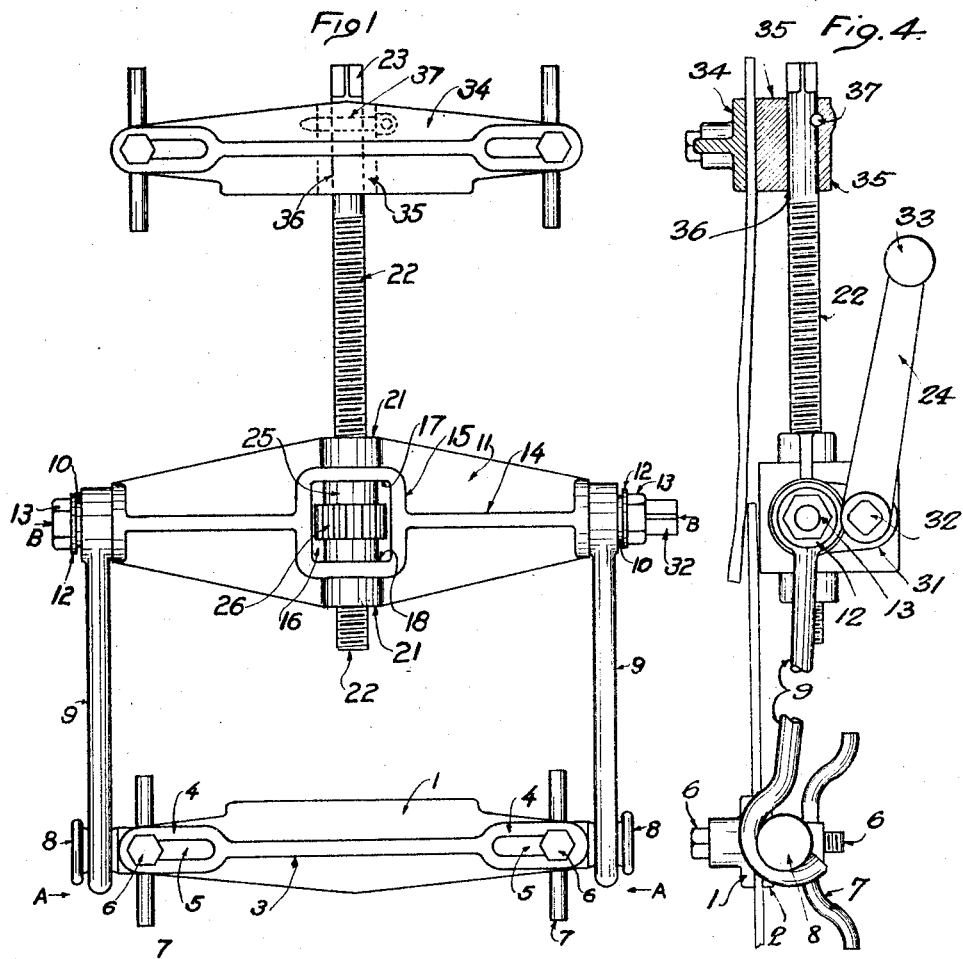
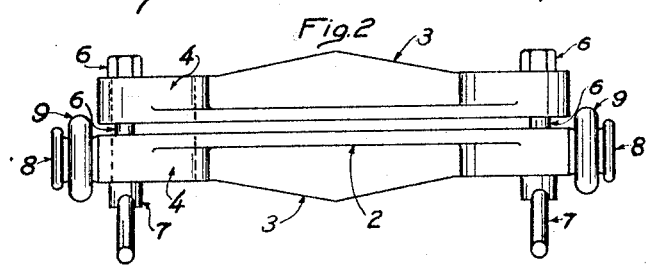
George E Fentress
INVENTOR Patented July 24, 1928.

1,678,287

UNITED STATES PATENT OFFICE.

GEORGE E. FENTRESS, OF LOS ANGELES, CALIFORNIA.

BELT TIGHTENER.

Application filed August 23, 1927. Serial No. 214,865.

The object of my invention is to provide a device for bringing the ends of belting together for the purpose of lacing said ends and producing a substantially endless belt.

A further object of my invention is to provide such a device which may be rapidly applied to and removed from the belt, which will grip the ends firmly without damaging them, and which will bring them rapidly and squarely together with the expenditure of a minimum amount of power.

Further objects and advantages of my improved tightener will be evident from the following description and from the attached drawings, in which:

Figure 1 is a plan view of the complete device,

Figure 2 is an end elevation of Figure 1 on the line A—A of Fig. 1,

Figure 3 is an illustration, partly in section and partly in elevation, on the line B—B of Figure 1.

Figure 4 is a right side elevation of Figure 1, parts being broken away.

Referring to all the figures, 1 and 2 are malleable-cast or forged bars between which one end of the belt is clamped. 3 is a relatively high and heavy rib formed on said bars, this rib being expanded near its ends as at 4—4 and slotted through as at 5—5 to receive the locking bolts 6—6, by which the bars are approached to each other by turning up the threaded wing nuts 7—7. The bolts 6, when loosened, may be approached to or retracted from each other by sliding them in slots 5, to accommodate various widths of belting.

The lower bar 2 is formed with beaded pins in each end as at 8, shaped to fit inside the hook end of the hook rods 9. The opposite ends of the hook rods 9 are formed into eyes which fit over straight pins 10—10 formed on the ends of center-block 11 and retained thereon by the washers 12 and the nuts 13, the ends of the pins being threaded. The washers should rest on a square shoulder at the root of the pin thread, so as not to bind the eyes against the block.

The center block has a stout rib 14 cast thereon, this rib being expanded into a rectangular section as at 15 and cored out as at 16 to form an opening through the central part of the block, the two ends 17 and 18 of this opening being faced smooth and parallel to each other at a right angle to the axis of the block. The ribs project on both sides of the block as indicated at 19 and 20 in Figure 3.

The ribs at the central portion of block 11 are extended to form the bosses 21 which are accurately fitted (not threaded) to act as guides for the temper screw 22, which preferably has a square thread. The end 23 of this screw is squared to fit a wrench, preferably that indicated at 24.

Inside the opening 16 is fitted, between the squared faces 17 and 18, a long nut 25 threaded internally to accurate engagement with screw 22 and provided outside with the worm gear 26. This gear meshes accurately with the worm pinion 27 which is carried on a shaft 28 supported as at 29—29 on a downward extension 30 of the rib 15, and at the right outer end of block 11 by a downward extension 31 thereof. The right end of shaft 28 is squared as at 32 to fit the wrench 24, which is preferably extended to form a crank having a handle 33.

The opposite clamp is similar in the main to the clamp shown in Figure 2 and only the points of difference need be noted. The upper clamp 34 is identical with clamp 1. The lower clamp has no end pins 8 but has at its center a longitudinal downward projection 35 through which the unthreaded end 36 of the screw 22 passes, and in which it is locked against end movement or rotation by the slip pin 37.

My improved belt tightner is operated as follows. The near end clamp (shown in Figure 2) is opened part way, one end of the belt slipped between the clamp bars, and the ring nuts turned up, thus firmly clamping the belt between the clamp bars, which should be at an exact right angle to the belt.

Slip pin 37 is withdrawn and screw 22 slid out of block 35, which is then clamped onto the opposite end of the belt in the same manner.

Wrench 24 is then applied to the squared end 23 of the screw and this screw backed out of the gear nut 25 as far as it will go. The plain end 36 of screw 22 is then inserted into block 35 and the pin 37 replaced.

The hook arms 9, which may have been left hanging on the pins 10, are now hooked over the pins 8, thus bringing the two ends of the belt to a distance from each other governed by the length of screw 22. Wrench 24 is then transferred to squared end 32 and the shaft 28 revolved right hand, which (assuming right hand pitch to both worm gear and screw) will revolve the gear nut 25 to the right and thus draw it up the screw 22, thus bringing the ends of the belt together.

I claim as my invention:

1. A belt tightener comprising, in combination: a rigid bar; a temper screw passing slidably through said bar on the shorter axis thereof; a geared nut engaging said screw and mounted thereon within said bar; a worm engaging said geared nut and attached to a shaft rotatably mounted on said bar; a hand operated means for rotating said shaft; a clamp for attachment to one end of a belt; means for detachably fixing one end of said temper screw in said clamp; a second clamp for attachment to the opposite end of said belt, and hook means for connecting said second clamp to said rigid bar.

2. A belt tightener comprising, in combination: two belt clamps and a rigid bar located between and parallel to said clamps; a geared nut fixed against end movement in said bar, said nut revolved by a worm and shaft mounted on said bar; a screw engaged by said nut and passing slidably through said bar, an end of said screw being fixed in one of said clamps; and means connecting said bar to the opposite clamp.

3. A belt tightener comprising, in combination: two belt clamps and a rigid bar located between and parallel to said clamps; a geared nut fixed against end movement in said bar, said nut revolved by a worm and shaft mounted on said bar; a screw engaged by said nut and passing slidably through said bar, an end of said screw being detachably fixed in one of said clamps; and detachable means connecting said bar to the opposite clamp.

4. A device substantially as in claim 3, in which the end of the screw detachably fixed in the clamp is detached by withdrawing a pin passing through a boss on the clamp and a slot on the face of the screw.

5. A device substantially as in claim 3, in which the screw, being detached from the clamp, may be revolved within the geared nut for backing up said screw without revolving the worm.

In witness that I claim the foregoing I have hereunto subscribed my name this 13th day of August, 1927.

GEORGE E. FENTRESS.